(12) United States Patent
Ansberry et al.

(10) Patent No.: US 6,356,275 B1
(45) Date of Patent: Mar. 12, 2002

(54) PIXEL COLOR MATCHING ACROSS X SERVERS IN NETWORK CONFERENCING SYSTEMS BY MASTER-PARTICIPANT PAIR MAPPING

(75) Inventors: Catherine Malia Ansberry; Todd W. Fuqua, both of Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/387,505

(22) Filed: Feb. 13, 1995

(51) Int. Cl.$^7$ ................................................ G09G 5/02
(52) U.S. Cl. ...................................................... 345/600
(58) Field of Search ............................... 395/153, 131, 395/157, 161, 329, 330, 335, 340; 345/150, 153, 199, 581, 589, 591, 593, 600, 601, 602

(56) References Cited

U.S. PATENT DOCUMENTS

| | | | |
|---|---|---|---|
| 4,129,859 A | 12/1978 | Iwamura et al. | 345/123 |
| 4,442,495 A | 4/1984 | Sukonick | 345/24 |
| 4,533,910 A | 8/1985 | Sukonick et al. | 345/118 |
| 4,642,790 A | 2/1987 | Minshull et al. | 395/158 |
| 4,736,407 A | 4/1988 | Dumas | 379/96 |
| 4,796,201 A | 1/1989 | Wake | 395/130 |
| 4,831,556 A | 5/1989 | Oono | 395/157 |
| 4,845,644 A | 7/1989 | Anthias et al. | 395/157 |
| 4,860,217 A | 8/1989 | Sasaki et al. | 395/125 |
| 4,893,326 A | 1/1990 | Duran et al. | 348/17 |
| 4,937,856 A | 6/1990 | Natarajan | 379/158 |
| 4,939,509 A | 7/1990 | Bartholomew et al. | 345/2 |
| 4,953,159 A | 8/1990 | Hayden et al. | 370/62 |
| 4,974,173 A | 11/1990 | Stefik et al. | 395/153 |
| 5,025,249 A | * 6/1991 | Seiler et al. | 395/131 X |
| 5,062,040 A | 10/1991 | Bishop et al. | 395/650 |
| 5,065,347 A | 11/1991 | Pajak et al. | 395/159 |
| 5,119,319 A | 6/1992 | Tanenbaum | 364/514 A |

(List continued on next page.)

OTHER PUBLICATIONS

Foley et al., Computer Graphics: Principles and Practice, 1990, p. 166–170, 568–573, 584–599.*

Hiebert et al., Sharing Overlay and Image Planes in the Starbase/X11 Merge System, Hewlett Packard Journal, p. 33–38, 12/89.*

Boyton et al., Sharing to Display Resources in the Starbase/X11 Merge System, Hewlett Packard Journal, p. 33–38, 12/89Hiebert et al., Sharing Overlay and Image Planes in the Starbase/X11 Merge System, Hewlett Packard Journal, p. 20–32, 12/89.*

D. M. Chess et al., IBM Technical Disclosure Bulletin, vol. 30, No. 6, Nov. 1987.

P. A. Appino et al., IBM Technical Disclosure Bulletin, vol. 35, No. 4A, Sep. 1992.

S. P. Thompson, IBM Technical Disclosure Bulletin, vol. 36, No. 06B, Jun. 1993.

*Primary Examiner*—Mark Zimmerman
*Assistant Examiner*—Enrique L Santiago
(74) *Attorney, Agent, or Firm*—Noreen A. Krall; Bracewell & Patterson, L.L.P.

(57) ABSTRACT

A method of mapping pixel IDs between X servers that differ in the format of pixel IDs they support is disclosed. The method involves defining a specific type of map for each master/participant pair, thus allowing X servers that support different formats to participate in one conference and to view colors that are as close to the application's request as each X server deems possible. A method of supporting applications that are dependent on mathematical operations on pixel values by an X Windows conferencing enabler is further disclosed. The mathematical operations on pixel values are common among X Windows applications that are color intensive, such as scientific visualization programs. This method allows these applications to be displayed with colors that are as close as the supports to the colors requested by the application as supported by the X server.

5 Claims, 1 Drawing Sheet

U.S. PATENT DOCUMENTS

| | | | | |
|---|---|---|---|---|
| 5,142,615 A | * | 8/1992 | Levesque et al. | 395/131 |
| 5,148,154 A | | 9/1992 | MacKay et al. | 345/119 |
| 5,148,521 A | | 9/1992 | Ebbers et al. | 395/155 |
| 5,175,854 A | | 12/1992 | Cheung et al. | 395/650 |
| 5,179,652 A | | 1/1993 | Rozmanith et al. | 395/155 |
| 5,191,644 A | | 3/1993 | Takeda | 395/158 |
| 5,195,086 A | | 3/1993 | Baumgartner et al. | 370/62 |
| 5,214,784 A | | 5/1993 | Ward et al. | 395/800 |
| 5,241,625 A | | 8/1993 | Epard et al. | 395/163 |
| 5,258,747 A | * | 11/1993 | Oda et al. | 345/153 |
| 5,280,583 A | | 1/1994 | Nakayama et al. | 395/200.04 |
| 5,289,574 A | | 2/1994 | Sawyer et al. | 395/157 |
| 5,293,619 A | | 3/1994 | Dean | 395/650 |
| 5,309,551 A | * | 5/1994 | Guttag et al. | 395/131 |
| 5,313,581 A | * | 5/1994 | Giokas et al. | 395/200 |
| 5,333,243 A | * | 7/1994 | Best et al. | 395/131 X |
| 5,343,311 A | * | 8/1994 | Morag et al. | 358/518 |
| 5,351,067 A | * | 9/1994 | Lumelsky et al. | 345/191 |
| 5,406,310 A | * | 4/1995 | Aschenbrenner et al. | 345/150 |
| 5,430,465 A | * | 7/1995 | Sabella et al. | 345/199 |
| 5,455,600 A | * | 10/1995 | Friedman et al. | 345/153 |
| 5,473,737 A | * | 12/1995 | Harper | 395/131 |
| 5,485,558 A | * | 1/1996 | Weise et al. | 395/131 |

* cited by examiner

PIXEL COLOR MATCHING ACROSS X SERVERS IN NETWORK CONFERENCING SYSTEMS BY MASTER-PARTICIPANT PAIR MAPPING

CROSS-REFERENCE TO RELATED APPLICATION

The present application is related to U.S. patent application Ser. No. 08/387,500, entitled Method and System For Switching Between Users In A Conference Enabled Application, U.S. patent application Ser. No. 08/387,502, entitled Method For Managing Top-Level Windows Within A Conferencing Network System, U.S. patent application Ser. No. 08/387,501, entitled Management And Classification of Events For An X Windows Conferencing Enabler U.S. patent application Ser. No. 08/387,503, entitled Method For Managing Visual Type Compatibility In A Conferencing Network System Having Heterogeneous Hardware, U.S. patent application Ser. No. 08/387,504, entitled Method To Support Applications That Allocate Shareable Or Non-Shareable Colorcells In A Conferencing Network System Having A Heterogeneous Hardware Environment, U.S. patent application Ser. No. 08/387,506, entitled Method And Apparatus For Translating Key Codes Between Servers Over A Conference Networking System, all filed of even date herewith by the inventors hereof and assigned to the assignee herein, and incorporated by reference herein.

BACKGROUND OF THE INVENTION

1. Technical Field

The present invention relates, generally, to a network system for conferencing an application over a group of servers and, more specifically, to a method for managing pixel information translated from an application in a conference to the group of servers. More specifically still, the present invention relates to a method to support X Windows applications that perform mathematical pixel manipulation by an X Windows conferencing enabler in a homogenous hardware environment. Additionally, the present invention relates to a method to support translation of pixels of X Windows applications by an X Windows conferencing enabler in a heterogenous hardware environment.

2. Description of the Related Art

X Windows provides distributed client/server support for two dimensional graphics. The X server manages the display for the application, two dimensional graphics within the window. The X Window conferencing enabler appears to the application to be an X server, while at the same time appearing to the X server as an application, as shown below. The X Windows conferencing enabler then connects to multiple X servers on behalf of the application, displaying the application's windows on each display. The application is not aware that it is being displayed on multiple X servers. Such a networking system is fully described in commonly assigned U.S. patent application Ser. No. 08/387,500, Method and System For Switching Between Users In A Conference Enabled Application incorporated herein by reference for all purposes.

In the absence of a conferencing enabler, the application connects to an X server and communicates with it using X protocol, asking the X server to create resources such as windows or to reserve resources such as pixel values on the server. Depending upon the nature of the request, the X server may either execute the requested action without response, it may reply to the application or it may return an error if the request cannot be satisfied.

For instance, when an application needs to use a specific color, it communicates to the X server the red, green and blue values or the color name it needs to use and the X server determines a pixel ID that the application can use. From that point on, the application will only refer to the pixel ID. There are two possible formats for the pixel ID, indexed and composite, determined by the graphics adaptor used by the X server. An indexed pixel ID is a single index into the colormap and the composite pixel ID is decomposed into separate indices for the red, green and blue values of the color.

When an application attempts to draw an object of a specific color, it provides the X server with a source pixel ID and a function for combining the source pixel value with the pixel value already displayed at the destination location. The X server performs the requested mathematical operation on the source and destination pixel values to calculate the pixel value that it should use to determine the color to actually display. In most instances, an application will indicate a function of "copy", which simply means to copy the source pixel into the destination, thus displaying the "source" color. In other cases, it is important to note that even if the application has allocated the source and destination pixel values, the result of the mathematical operation on these values may or may not be an allocated pixel.

When an X Windows application is running through a conferencing enabler, this process of selecting pixel IDs that are valid on each participant's X server is a difficult one. In particular, there are three distinct cases the conferencing enabler must be able to support in order for an application in a conference to display the correct colors on each participants' workstation. The most simple situation occurs when the application requests to use a function of "copy" with source and destination pixel values that have both been allocated, and the participants' workstations are the most common X capability of an 8-bit indexed visual type. In this case, the pixel ID mapping is no different than the mapping of any other resource identifiers.

The second case is when the application requests to use a function of "copy" with source and destination pixel values that have both been allocated, and the participants' workstations differ in their support of visual types. This is particularly difficult when the servers differ in the format of pixel IDs. Accordingly, what is needed is a method to accurately and quickly translate pixel IDs between X servers in a conference that differ in the format of pixel IDs that they support. Without this support, the application would not display correctly in a conferencing environment.

The third case is when the application requests a function other than "copy" with source and destination pixels that have been allocated, when the participants' workstations support identical formats of pixel IDs. Applications that deal with shaded images or visualization commonly use this technique to display detailed graphics. Unfortunately, solutions that are adequate in the other cases do not suffice when the application is performing these mathematical operations on pixel IDs. For, if the conference enabler simply distributed these requests with the appropriate pixel ID translation, the mathematical manipulations performed by each X server would yield a different pixel value, and, more likely than not, a different color would be displayed for each participant. Accordingly, the conferencing enabler must provide a means for applications that are dependent on mathematical manipulations performed on pixel values to display colors accurately for all the X servers in the conference.

SUMMARY OF THE INVENTION

It is therefore one object of the present invention to provide a network system for conferencing an application over a group of servers.

It is another object of the present invention to provide a method for managing pixel information translated from an application in a conference to the group of servers.

It is yet another object of the present invention to provide a method to support X Windows applications that perform mathematical pixel manipulation by an X Windows conferencing enabler in a homogenous hardware environment.

It is yet another object of the present invention to provide a method to support translation of pixels of X Windows applications by an X Windows conferencing enabler in a heterogenous hardware environment.

The foregoing objects are achieved as is now described. According to the present invention, a method of mapping pixel IDs between X servers that differ in the format of pixel IDs they support is disclosed. The method involves defining a specific type of map for each master/participant pair, thus allowing X servers that support different formats to participate in one conference and to view colors that are as close to the application's request as each X server deems possible. A method of supporting applications that are dependent on mathematical operations on pixel values by an X Windows conferencing enabler is further disclosed. The mathematical operations on pixel values are common among X Windows applications that are color intensive, such as scientific visualization programs. This method allows these applications to be displayed with colors that are as close to the colors requested by the application as supported by the X server.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
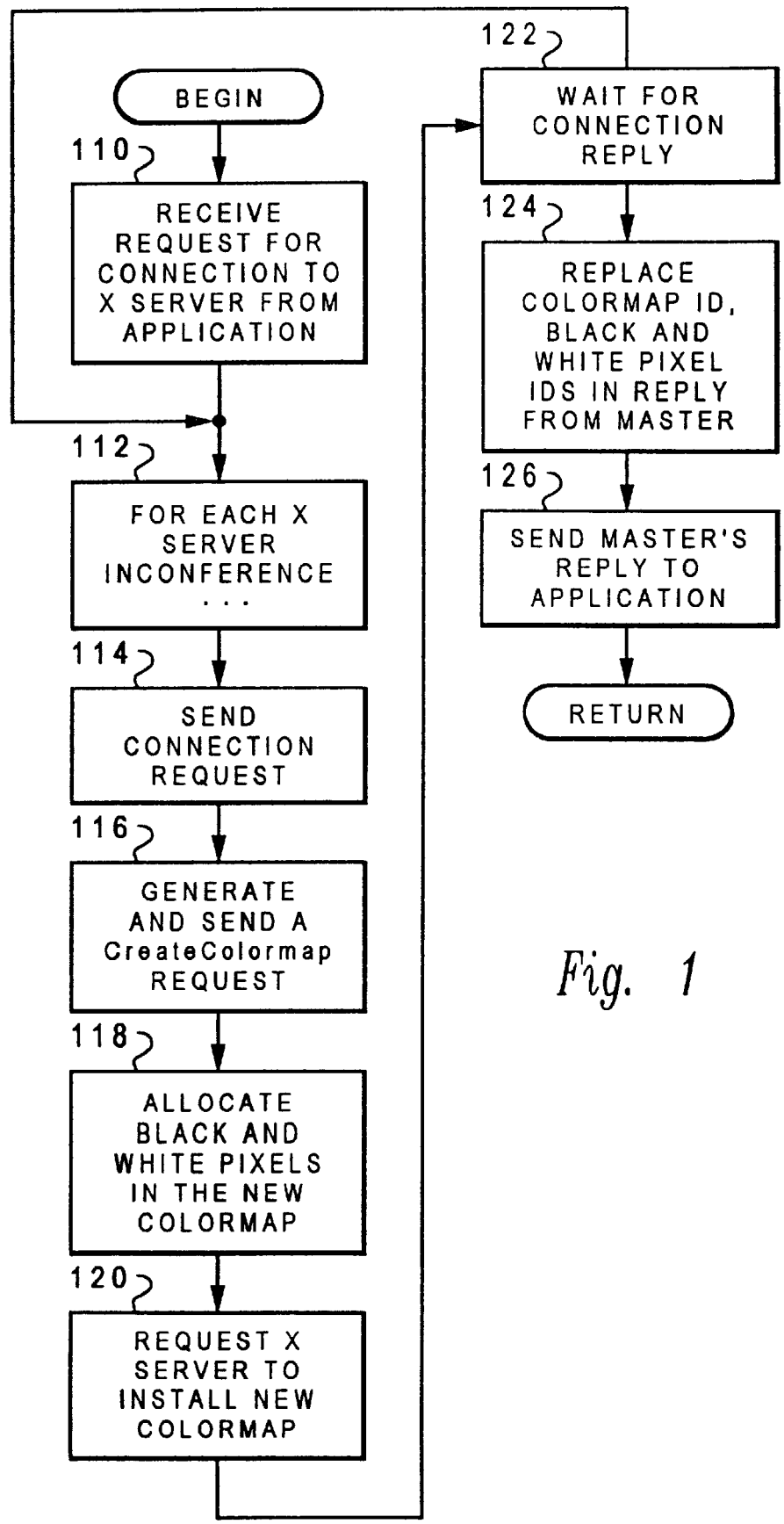
FIG. 1 depicts in accordance with a preferred embodiment of the present invention a flowchart of the method of supporting translating pixel IDs.

The present invention is modeled to run on an X Windows conference enabler network system as described in the background of the invention. The specific implementation of the conference enabler is described in greater detail in commonly assigned copending U.S. patent application Ser. No. 08/387,502, titled Method For Managing Top-Level Windows Within A Conferencing Network System, herein incorporated by reference for all purposes. In that application, the function of a master is described. An additional purpose for the role of master is to allow the application or applications to have an accurate view of one X server in the conference. For most server characteristics, this is the X server upon which the application believes it is being displayed. Accordingly, when the conferencing enabler is attempting to map pixel IDs between participants, it becomes a problem of mapping other participants' pixel IDs to the master's pixel IDs, and vice-versa. The X Windows conference enabler defines a specific type of pixel map that translates pixel IDs between the different formats available on each master/participant pair, as shown in Table 1.

|        |           | participant |              |
|--------|-----------|-------------|--------------|
|        |           | indexed     | composite    |
| master | indexed   | indexed map | IC-map       |
|        | composite | CI-map      | composite map |

The process each of these maps uses to translate pixel IDs between the master and the participant is described below.

Indexed Map

The indexed map returns the pixel ID from the master X server and then the pixel ID is translated directly into the pixel ID that was returned at the same time from the participant's X server. If a mapping cannot be found, the pixel is passed on unchanged.

IC-Map

The Indexed/Composite (IC) map is used when the application believes it is using an indexed colormap; however, the conferencing enabler determines that the best match available on that X server is a composite colormap. In this case, the "explicit mapping" process may be used. This is appropriate because any application that explicitly request IDs, which all applications that want to control their colors will do occasionally, will usually only use those IDS. A one-to-one mapping then exists in this case between the pixel IDs identified by the master X server and those identified by the participant's X server. If a mapping cannot be found, the pixel must be converted to the appropriate form for its destination. This means that a pixel being sent to the participant must be in the composite form, while one being sent to the application must be in the indexed form. The result is then an unpredictable color; however, something shall be drawn.

CI-Map

The Composite/Indexed (CI) map is used when the application believes it is using a composite colormap; however the participant has the indexed type. Since the participant with the indexed format has less powerful graphics adaptor available to it, this is the case where the conferencing enabler is not always capable of creating an adequate mapping. As a default, the explicit mapping between pixel IDs is used. However, an application that takes advantage of the ability to use combinations of decomposed pixel IDs does not necessarily translate accurately to an indexed pixel ID. If a mapping cannot be found, the pixel must be converted to the appropriate form for its destination. That is, a pixel being sent to the participant must be in the indexed form, while one being sent to the application must be in the composite form. This results in an unpredictable color; however, something will be drawn.

Composite Map

The composite map is more complex than the other two maps, for it must manage mapping between two X servers who allocate pixels as decomposed values for red, green, and blue. In this case, the conference enabler actually maps the decomposed values for each of the red, green, and blue components in the pixel ID received from the application, which is in the terms of the master X server, to create the composite pixel ID for the participant, or vice-versa. This is because an application that, for instance, requests its composite colormap to provide two pixel values for two sets of red, green, and blue, may then take each of the decomposed values returned in those two pixel IDs and create other pixel IDs. Since the application can use combinations of decomposed pixel values, the conferencing enabler is able to map these decomposed values to create a valid, equivalent pixel ID on each of the X servers in the conference. If a mapping cannot be found, the pixel is passed on unchanged.

Turning now to solving the problem of allowing applications to display the correct pixel values in a conferencing environment when an application is using mathematical operations between pixels, it is important to understand that if the conferencing enabler could "force" each X server in the conference to allocate the same color values (red, green, and blue) to equivalent pixel values, then it would be true that if an application performed mathematical operations on pixel values, the results of those operations would also be identical. Additionally, It is important that a principle of an X server's allocation of pixels is that a server can allocate pixels in a colormap in numerically increasing values. That is, it does allocate first pixel 0, then pixel 1, . . . , until it has allocated the entire map. A conferencing enabler can use this principle to assist in solving the problem.

A conferencing enabler can support applications that perform mathematical operations for manipulations on pixel values by creating and installing a colormap on behalf of each application in the conference. The colormap then is exposed to the application as the "default" colormap on the X server, and the application then uses it as it would normally use the default colormap. FIG. 1 illustrates a flow chart depicting the method of implementation.

In step 110, the application requests connection to the X server by connecting to the conference enabler. In step 114, the conference enabler, on behalf of the application (step 112) requests a connection on each X server in the conference. Then, in step 116, the conference enabler generates a colormap on each X server in the conference. At the same time, in order to stimulate the behavior of the default colormap, the conference enabler also allocates "black" and "white" colors in this colormap (step 118). Next, in step 120, the conference enabler installs, or requests the window manager to install, the colormap that was created in step 116. In step 122, the system then monitors for a connection reply from every X server in the conference by the conference enabler and, once a reply is received, the conference enabler replaces the real X server default map ID with the colormap ID, as well as the black and white pixel IDs, of the colormap generated in step 124. Lastly, in step 126, the enabler sends the master's reply to the application.

From this point on, the application (if it was intending to use the default colormap) may allocate and free colors and use those pixel values in any way it deems appropriate. Based on the principles stated earlier, every time the application allocates a color, each X server in the conference then assigns the same pixel value to that color. Accordingly, any mathematical operation on the pixel values then has the same result, with the same color being displayed on each X server. Importantly, this method is used only when the format of the visual types of the X servers in a conference are identical. This is due to the fact that if the formats of the pixel values are not identical, then the mathematical operations performed on those pixel values do not result in identical values.

While the invention has been particularly shown and described with reference to a preferred embodiment, it will be understood by those skilled in the art that various changes in form and detail may be made therein without departing from the spirit and scope of the invention.

What is claimed is:

1. In a networking system that provides conferencing of an application among a plurality of X servers, each using the same colormapping format, a method of supporting applications that are dependent upon translation of pixel values by a conferencing enabler, comprising the steps of:

(A) requesting a connection to all desired servers;

(B) requesting a connection on each server within said conference;

(C) generating a colormap on each server in said conference in response to an occurrence of said requested connection;

(D) allocating black and white pixel IDs in said colormap;

(E) installing said generated colormap on each of said servers; and (F) replacing a default colormap ID and black and white pixel IDs within a reply sent to the application from each X server with a colormap ID of said colormap generated in step (C).

2. The method according to claim 1 wherein said specific type of map for each master/participant pair is an indexed map.

3. The method according to claim 1 wherein said specific type of map for each master/participant pair is a composite map.

4. The method according to claim 1 wherein said specific type of map for each master/participant pair is an indexed/composite map.

5. The method according to claim 1 wherein said specific type of map for each master/participant pair is an composite/indexed map.

* * * * *

UNITED STATES PATENT AND TRADEMARK OFFICE
CERTIFICATE OF CORRECTION

PATENT NO. : 6,356,275
DATED : March 12, 2002
INVENTOR(S) : Ansberry et al.

It is certified that error appears in the above-identified patent and that said Letters Patent is hereby corrected as shown below:

<u>Column 6,</u>
Line 46, please delete "an" and add -- a --.

Signed and Sealed this

Twenty-first Day of May, 2002

Attest:

Attesting Officer

JAMES E. ROGAN
*Director of the United States Patent and Trademark Office*